(No Model.)

J. M. COOK.
MOTOR VEHICLE.

No. 569,175. Patented Oct. 13, 1896.

3 Sheets—Sheet 1.

Witnesses:—
M. McDonald.
C. A. Smith.

Inventor:
James M. Cook
per Thurman and Silvius
Attorneys.

(No Model.)  3 Sheets—Sheet 2.
J. M. COOK.
MOTOR VEHICLE.
No. 569,175.  Patented Oct. 13, 1896.

Witnesses.
M. McDonald
C. A. Smith

Inventor.
James M. Cook
per Thurman & Silvius
Attorneys.

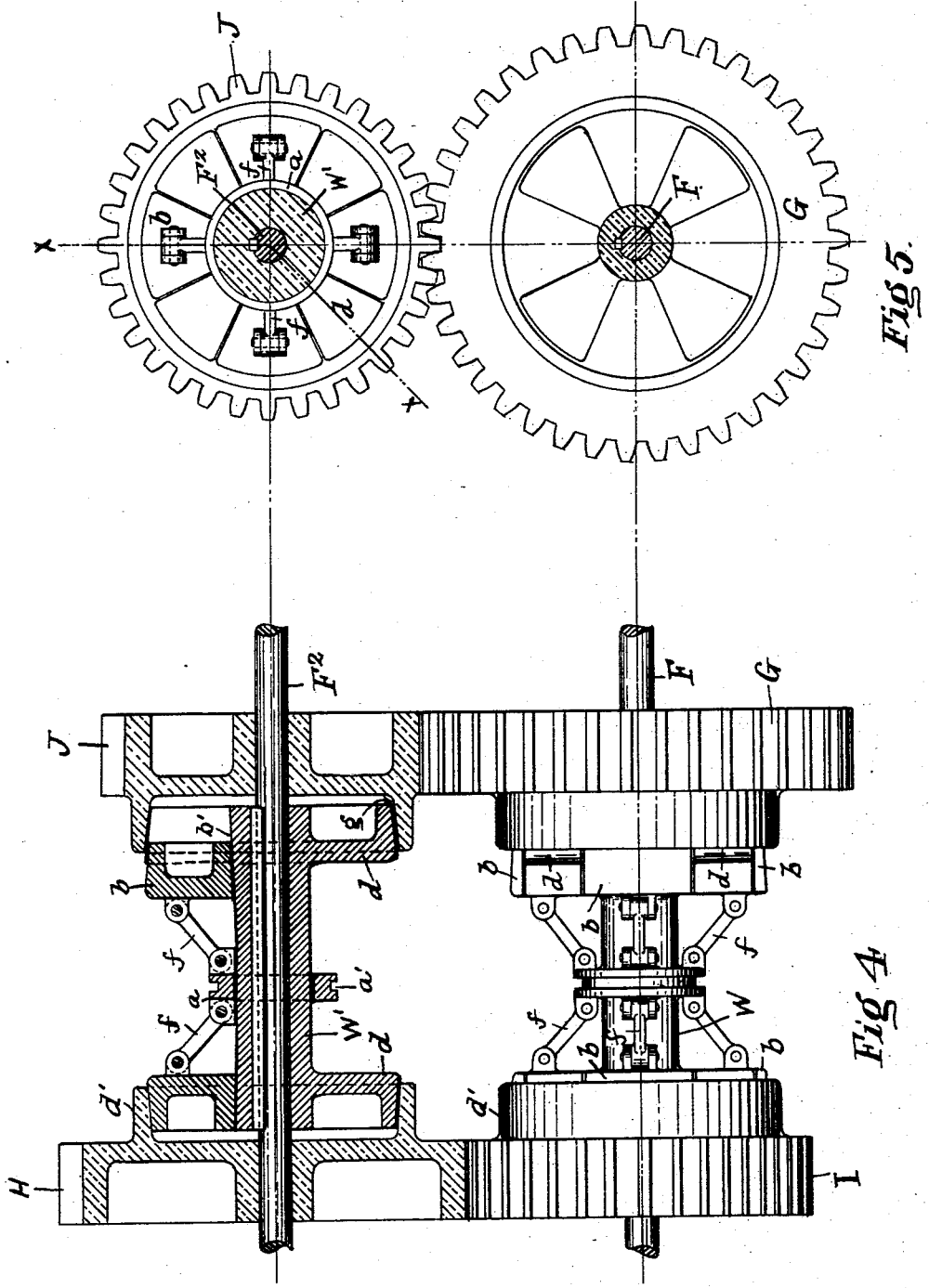

UNITED STATES PATENT OFFICE.

JAMES MURRAY COOK, OF MOUNT GILEAD, OHIO.

MOTOR-VEHICLE.

SPECIFICATION forming part of Letters Patent No. 569,175, dated October 13, 1896.

Application filed February 7, 1896. Serial No. 578,365. (No model.)

*To all whom it may concern:*

Be it known that I, JAMES MURRAY COOK, a citizen of the United States, residing at Mount Gilead, in the county of Morrow and State of Ohio, have invented certain new and useful Improvements in Motor-Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of motor-vehicles which are used on highways and propelled by means of a suitable engine or motor and connecting-gearing mounted upon the vehicle-frame; and it consists of certain parts and combinations of devices whereby power from a motor is applied to operate, reverse, and vary the speed of the vehicle without altering the motion of the motor, and provision is made for guiding the vehicle, as will be hereinafter more fully described.

The object of my invention is to provide a motor-vehicle that is suitable for use on wagon-roads which may be easily operated fast or slow, started, stopped, or reversed without changing the motion of the engine or stopping it, and which may be constructed either for carrying persons or freight and so that the mechanism may be compact and occupy no great amount of the carrying-space.

A further object is to provide a simple and efficient means for guiding the vehicle.

With these objects in view my invention is of few parts, cheaply constructed, and is efficient, durable, and economical in use.

Figure 2:
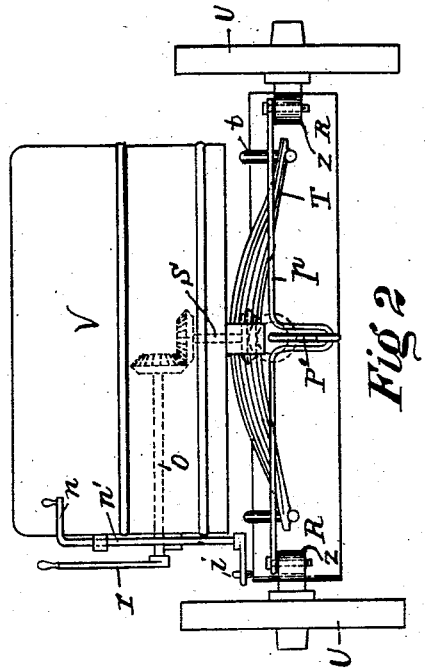
Figure 1:
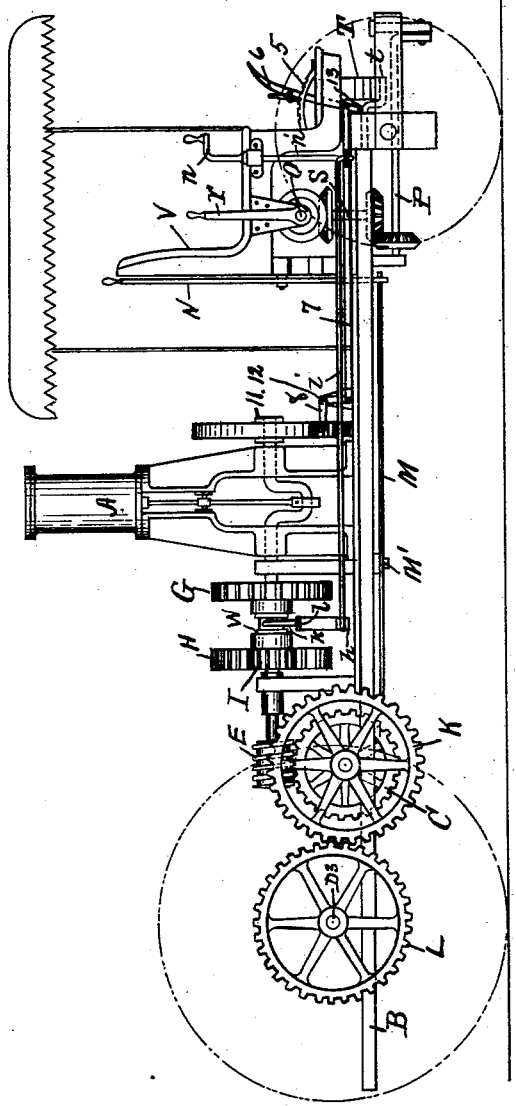
Figure 6:
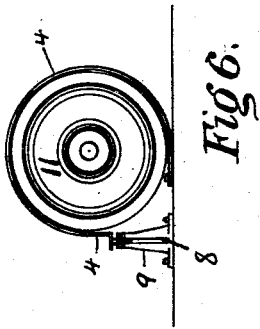
Figure 3:
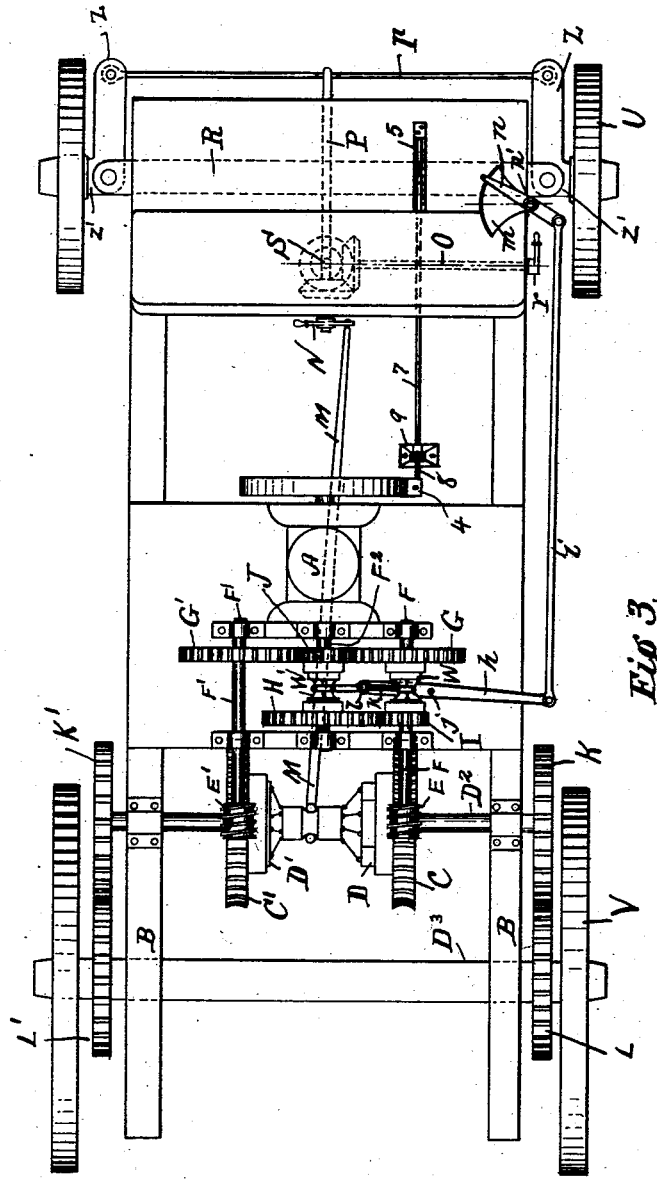

Referring to the drawings, in which the gearing is enlarged disproportionately to better show the details of the mechanism, Figure 1 represents a side elevation of a vehicle embodying my devices; Fig. 2, an end elevation; Fig. 3, a top plan; Fig. 4, a top plan of the speed-changing frictional gearing, half of which is shown in section on the line $x\ x$ of Fig. 5. Fig. 5 is a transverse view through center of Fig. 4 with parts shown in section, and Fig. 6 is a front view of balance-wheel with friction-brake applied.

In the drawings, A is the cylinder of an engine, which may be of any suitable design for gas or gasolene, having a frame or bed and mounted on the frame B of the vehicle.

C C' are worm-gears, mounted and revoluble on the shaft $D^2$, which is journaled in boxes secured to the vehicle-frame. At each end of this shaft are gear-wheels K K', meshing with gear-wheels L L', secured to the axle $D^3$, to which are secured carrying-wheels V. On the inner face of each worm-gear is a suitable rim, which may be engaged by the friction-clutches D or D' when manipulated and moved endwise by the levers M and N, the former being fulcrumed at M'. Supported in journal-boxes secured to a suitable frame are revoluble shafts F F' $F^2$, the shaft $F^2$ receiving its motion direct from the engine or motor. Gear-wheels H and J of different diameters are revoluble on the shaft $F^2$, and each is fitted at its inner face with a rim $d'$, having a conical friction-face $g$, which may be engaged by friction-clutch W', secured to shaft $F^2$, and having expansion-blocks $b$, movable between guide-blocks $d$. The blocks $b$ are actuated by the links $f$, which also expand the blocks, which slide on a tapering base $b'$ when making contact with the rim $g$.

At the center of the clutch-body is a sleeve $a$, having a groove $a'$, which is engaged by one end of the equalized lever $k$, swiveling at $l$ on the end of the lever $h$, which is fulcrumed at $j$. The opposite end of the lever $k$ engages with a like groove around the center of a collar on the body of a clutch W, which is secured to the shaft F. Gear-wheels G and I, made like H and J, are mounted on shaft F, and are revoluble thereon, but are transposed relatively, so that the smaller wheel I engages the larger wheel H and the larger wheel G engages the smaller wheel J. The clutches on both shafts, being engaged by opposite ends of the same lever, pivoted at or near its center, are moved simultaneously toward either pair of clutch-rims. The lever $h$ is actuated by means of a lever $n$ at the top of shaft $n'$ and connecting-rod $i$. A rack $m$ is used, to which the lever $n$ may be latched by suitable means. A gear-wheel G' is secured to shaft F' and meshes with wheel J. The rotation of shaft F propels the vehicle backward at a slow speed, it being deemed undesirable to run backward at a high rate of speed. When the clutches W and W' are thrown forward to engage with gears J and G, either a forward or backward slow motion may be produced by throwing the clutch D or D' into the proper connection with worm-gears C or C', the latter being for backward and the former for forward motion. To increase the speed for forward motion, the clutches W and W' are thrown into contact with gears H and I, and disengaging either of the clutches will stop the vehicle while the motor continues in motion.

As an improved mechanism for reducing or graduating the speed when descending a hill, and to effectually hold the vehicle promptly when stopped, I apply a friction brake-band 4 to the balance-wheel 11 of the motor. The plan of using a brake in connection with the carrying or road wheels of vehicles has the objection that the brake throws off dust or dirt, and this is avoided in my arrangement. The band 4 is secured at one end to the frame below the wheel and passes nearly around it, the other end being connected to a bell-crank 8, fulcrumed at 12 to a stand 9. A rod 7 connects the bell-crank with a foot-lever 6, working in a rack 5 and fulcrumed at 13.

As an improved arrangement for guiding the vehicle, I mount the forward wheels U on short axles Z' Z', having arms Z, extending forward, which are connected by the coupling-bar $p$. The axles are pivoted to the frame-piece R, which also carries a pair of hangers $t$, which support the ends of leaf-spring T, upon which the front of the vehicle-body is carried. Located under the seat V are shafts O and S, which are connected by suitable miter-gears. The shaft O is provided with a lever $r$ within convenient distance from the seat. The shaft S is in connection with a shaft P by means of suitable miter-gears, and the forward end of shaft P has a lever P', which connects with a drop-loop in the bar $p$. Thus it is obvious that a movement of the lever $r$ rotates the shafts O, S, and P, giving a rocking motion to the lever P', which causes the bar $p$ to move endwise, throwing the forward wheels at any angle or parallel, as may be desired.

It is obvious that minor changes in the details of construction may be made without departing from the intents and purposes of my invention.

Having described my invention, what I claim, and desire to secure by Letters Patent, is—

1. The combination, in a vehicle, of an engine supported on a framework thereof; a shaft operated by said engine; a small and a large gear-wheel running loosely on said shaft, a clutch mounted upon and secured to said shaft between said gear-wheels, so that when said clutch is engaged with either of said wheels motion is imparted to them from the said shaft; a pair of parallel shafts, one on either side of said engine-shaft; a small and a large gear loosely mounted on one of said parallel shafts, the larger wheel engaging with the smaller wheel on the engine-shaft, and the smaller one engaging with the larger one on said engine-shaft; a clutch mounted and secured to said parallel shaft between said gear-wheels thereon; a gear-wheel mounted and secured to the other of said parallel shafts engaging the smaller of the gear-wheels on said engine-shaft, and means for manipulating said clutches simultaneously, substantially as shown and for the purposes set forth.

2. In a vehicle, the combination of the framework and running-gear, an engine supported by said framework; the gear-wheels and clutch on the driving-shaft; the parallel shafts having the gear-wheels engaging the gear-wheels on said driving-shaft; the worm-gears secured to said parallel shafts; a pair of gear-wheels mounted revolubly on a transverse shaft and engaging said worm-gears; a clutch mounted and secured to said transverse shaft between said gear-wheels thereon so that said clutches may engage with said wheels, and intermediate gearing by which motion is transmitted to the driving-wheels of said vehicle, substantially as described.

3. In a motor-vehicle, the combination of the shaft F², wheels J and H, clutch W', shaft F, wheels G and I, clutch W, shaft F' and wheel G' all mounted and operating substantially as shown and for the purposes set forth.

4. In a motor-vehicle, the combination of a framework and running-gear; an engine supported by said framework; the shafts and gearing connecting said engine to drive said vehicle; a suitable seat and canopy supported upon said framework; the frame-piece R; the short axles Z' pivoted to said frame-piece and having the arms Z connected by the bar $p$ having the drop-loop; the shaft P having the lever P' connected to said drop-loop; the shaft S and shaft O, said shafts being connected and operated by means of suitable miter gear-wheels, and the lever $r$ all arranged and operating substantially as described and shown for the purposes set forth.

In testimony whereof I affix my signature in presence of two witnesses.

JAMES MURRAY COOK.

Witnesses:
 C. H. WOOD,
 H. B. McMILLIN.